United States Patent [19]

Genz et al.

[11] Patent Number: 4,945,130

[45] Date of Patent: Jul. 31, 1990

[54] MOLDING COMPOSITIONS OF POLYCARBONATE, THERMOTROPIC POLYMER, GRAFT POLYMER AND FLUORINATED POLYOLEFIN

[75] Inventors: Joachim Genz; Hans-Rudolf Dicke, both of Krefeld; Ulrich Grigo, Kempen; Werner Nouvert e, Krefeld, all of Fed. Rep. of Germany

[73] Assignee: Bayer Aktiengesellschaft, Leverkusen, Fed. Rep. of Germany

[21] Appl. No.: 408,473

[22] Filed: Sep. 15, 1989

Related U.S. Application Data

[63] Continuation of Ser. No. 206,820, Jun. 15, 1988, abandoned.

[30] Foreign Application Priority Data

Jun. 27, 1987 [DE] Fed. Rep. of Germany ....... 3721239

[51] Int. Cl.$^5$ ...................... C08L 69/00; C08L 67/00
[52] U.S. Cl. ........................................ 525/67; 525/64; 525/66; 525/146

[58] Field of Search .................. 525/67, 66, 148, 146, 525/64

[56] References Cited

U.S. PATENT DOCUMENTS

| | | | |
|---|---|---|---|
| 3,644,574 | 2/1972 | Jackson et al. | 525/165 |
| 3,723,373 | 3/1973 | Lucas | 525/165 |
| 4,189,549 | 2/1980 | Matsunaga et al. | 525/444 |
| 4,656,227 | 4/1987 | Lindner et al. | 525/133 |
| 4,766,165 | 8/1988 | Kress et al. | 525/67 |

FOREIGN PATENT DOCUMENTS

| | | |
|---|---|---|
| 0206058 | 12/1986 | European Pat. Off. . |
| 2035390 | 1/1971 | Fed. Rep. of Germany . |
| 2356697 | 1/1978 | France . |

*Primary Examiner*—John C. Bleutge
*Assistant Examiner*—David Buttner
*Attorney, Agent, or Firm*—Connolly and Hutz

[57] ABSTRACT

Moldings of mixtures of an aromatic polycarbonate and a thermotropic polymer show a reduced tendency towards delamination when they contain a fluorinated polyolefin and an elastomeric graft polymer.

6 Claims, No Drawings

MOLDING COMPOSITIONS OF POLYCARBONATE, THERMOTROPIC POLYMER, GRAFT POLYMER AND FLUORINATED POLYOLEFIN

This application is a continuation, of application Ser. No. 206,820, filed June 15, 1988, now abandoned.

This invention relates to thermoplastic molding compositions of an aromatic polycarbonate, a thermotropic polymer, an elastomeric graft polymer and a fluorinated polyolefin, to a process for the production of these molding compositions and their use for the production of molded articles (mainly by injection molding), filaments, fibers and films.

Mixtures of aromatic polycarbonate and thermotropic polymer are known (EP-A No. 33 175, GB-P No. 1,538,632). Although these mixtures have many desirable properties, they also have disadvantages. For example, molded articles produced from them are inclined to delaminate. This tendency is particularly apparent when molded articles, such as sheets for example, are divided by cutting, sawing, stamping or the like. An increased tendency towards delamination is observed particularly when forces act on the cut surface. Such forces can lead to unwanted splitting of the molded article.

Accordingly, the present invention relates to thermoplastic molding compositions of A. 1 to 98.87, preferably 50 to 94.4 and more preferably 80 to 94.4% by weight of an aromatic polycarbonate, B. 1 to 86, preferably 5 to 44.4, more preferably 5 to 19.4% by weight of a thermotropic polymer, C. 0.05 to 5 and preferably 0.1 to 1% by weight of a fluorinated polyolefin and D. 0.08 to 8 and preferably 0.5 to 5% by weight of an elastomeric graft polymer, the percentages being based in each case on the sum of components A to D.

Aromatic polycarbonates A

Preferred aromatic polycarbonates A are homo- and co-polycarbonates based on at least one diphenol corresponding to the following formulae:

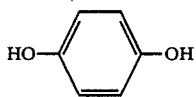

(I)

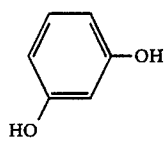

(II)

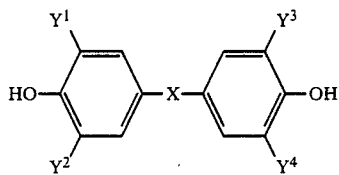

(III)

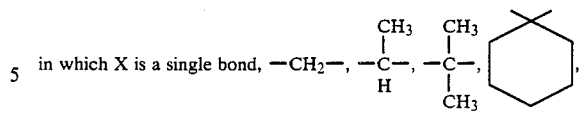

in which X is a single bond, $-CH_2-$, $-\underset{\underset{H}{|}}{\overset{\overset{CH_3}{|}}{C}}-$, $-\underset{\underset{CH_3}{|}}{\overset{\overset{CH_3}{|}}{C}}-$, cyclohexyl,

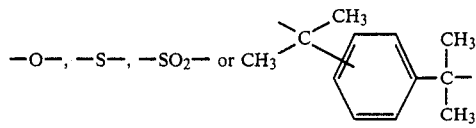

$-O-$, $-S-$, $-SO_2-$ or isopropylidene-diphenyl groups and $Y^1$ to $Y^4$ independently of one another represent hydrogen, $C_1$–$C_4$ alkyl, preferably methyl, or halogen, preferably chlorine or bromine.

These and other suitable diphenols are described, for example, in U.S. Pat. Nos. 3,028,365, 3,275,601, 3,148,172, 3,062,781, 2,991,273, 3,271,367, 2,999,835, 2,970,131 and 2,999,846; in DE-OSS No. 1 570 703, 2 063 050, 2 063 052, 2 211 956, 2 211 957; FR-P No. 1 561 518 and in the work by H. Schnell entitled "Chemistry and Physics of Polycarbonates", Interscience Publishers, New York, 1964.

Preferred diphenols are, for example, 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dimethyl-4-hydroxyphenyl)-propane, 1,1-bis-(3,5-di-methyl-4-hydroxyphenyl)-ethane, bis-(3,5-dimethyl-4-hydroxyphenyl)-methane and bis-(4-hydroxyphenyl)-sulfide.

The aromatic polycarbonates A may be branched by incorporation of small quantities, preferably 0.05 to 2.0 mole-% (based on the diphenols used), of trifunctional or more than trifunctional compounds.

Preferred branching agents for the polycarbonates A are at least trifunctional compounds of the type described, for example, in DE-OSS Nos. 1 570 533 and 1 595 762 and in U.S. Pat. No. 3,544,514, namely preferably trihydric phenols, aromatic tricarboxylic acids or reactive derivatives thereof and hydroxycarboxylic acids containing at least three functional groups. Examples of preferred branching agents are 2,4-bis-(4-hydroxyphenylisopropyl)-phenol, 2,6-bis-(2'-hydroxy-5'-methylbenzyl)-4-methylphenol, 2-(4-hydroxyphenyl)-2-(2,4-dihydroxyphenyl)-propane, 1,4-bis-(4,4'-dihydroxytriphenylmethyl)-benzene, 2,4-dihydroxybenzoic acid, trimesic acid, cyanuric chloride, 3,3-bis-(4-hydroxyphenyl)-2-oxo-2,3-di-hydroindole and 3,3-bis-(4-hydroxy-3-methylphenyl)-2-oxo2,3-dihydroindole.

The aromatic polycarbonates A have average molecular weights $M_w$ of generally 10,000 to 200,000 and preferably from 20,000 to 80,000, as determined by light scattering.

To adjust the molecular weight $M_w$ of the polycarbonates A, chain terminators may be used in a known manner in the calculated quantities.

Preferred terminal groups for the polycarbonates A are residues of phenol, benzoic acid, mono- and dialkylphenols and mono- and dialkylbenzoic acids, of which the alkyl substituents may contain in all up to 20 carbon atoms per terminal group. Particularly preferred terminal groups correspond to the following formula

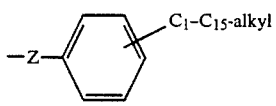

in which
Z represents

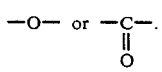

Examples of preferred terminal groups are the residues of phenol, p-tert.-butylphenol, p-isooctylphenol, p-n-nonylphenol, 3,5-di-tert.-butylphenol, 2-(3,5-dimethylheptyl)phenol and 3-(3,5-dimethylheptyl)-phenol.

Instead of the free phenols, it is possible to use their halocarbonic acid esters and, instead of the carboxylic acids, their acid chlorides. The quantities in which the terminal groups are present are preferably 1 to 10 mole-%, based on the diphenol residues of the polycarbonate A.

Thermotropic polymers B

"Thermotropic" materials are materials which form liquid crystal melts. Thermotropic polymers are sufficiently well known, cf. for example
- F. E. McFarlane et al., Liquid Crystal Polymers II, Contemporary Topics in Polymer Science, Vol. 2, Plenum Publishing Corporation, 1977;
- W. J. Jackson and H. F. Kuhfuss, J. Polymer Science, Polymer Chem. Ed. 14, 2042 (1976);
- W. C. Wooten et al. in A. Ciferri "Ultra-high Modulus Polymers", Applied Science Publ., London 1979, pages 362 et seq.;
- A. Blumstein et al., "Liquid Crystalline Order in Polymers", Academic Press 1978;
- J. Preston, Angew Makromol, Chem. 109/110, pp. 1–19 (1982);
- A. Ciferri, W. R. Krigbaum, R. B. Meyer "Polymer Liquid Crystals", Academic Press, New York, 1982;
- EP Nos. 1185, 1340, 8855, 11 640, 15 856, 17 310, 18 145, 18 709, 22 344, 44 205, 49 615;
- U.S. Pat. Nos. 3,991,013, 3,991,014, 4,066,620, 4,067,852, 4,083,829, 4,107,143;
- WO Nos. 79/797, 79/1034, 79/1040.

The liquid crystalline state of polymer melts may be investigated using a polarization microscope. To this end, the eyepiece was fitted with an attachment comprising a photodiode arranged at the focal point of the eyepiece lens. Using a following measuring amplifier with control device and with the microscope switched on, the measured value was adjusted to 100 scale graduations in the absence of a sample with the Nicol prisms arranged parallel. With the Nicol prisms crossed, a value of 0.01 graduation was then obtained.

The layer thickness of the polycondensate melts investigated was 100 μm.

The polycondensates were investigated after the samples had been melted at temperatures of 280° to 400° C. Providing the melt observed between the crossed Nicol prisms lightened throughout this range or in a part thereof, the polycondenate was classified as a thermotropic liquid crystal.

The liquid crystal polycondensates show values of more than 1 scale graduation in the measuring arrangement and, generally, values of 3 to 90 scale graduations. By contrast, amorphous melts, for example aromatic polycarbonates, produced values of less than 0.1 graduation.

The method described above is particularly suitable for rapid determination in the laboratory and provides conclusive results in almost every case. In doubtful cases, it can be useful to demonstrate the presence of liquid crystal components by X-ray wide-angle scattering in the melt, as described for example in G. W. Gray and P. A. Windsor, "Plastic Crystals, Physico-Chemical Properties and Methods of Investigation", more particularly Chapter 3, John Wiley & Sons, New York/Sydney/Toronto, 1974.

The following thermotropic polymers B for example are suitable for the preparation of the mixtures according to the invention: polyesters, polythioesters, polyester amides, polyester imides, polyazomethines, polyester carbonates.

Preferred thermotropic polymers B are fully aromatic polyesters based on
a. aromatic dicarboxylic acids,
b. diphenols and, optionally,
c. aromatic hydroxycarboxylic acids, the molar ratio of residues of co-condensed aromatic dicarboxylic acids to residues of co-condensed diphenols being from 0.95 to 1.05 and the residues of co-condensed aromatic hydroxycarboxylic acids making up from 0 to 100 mole-%, preferably from 30 to 80 mole-% and more preferably from 50 to 70 mole-%, based on co-condensed residues (a) and (c).

Aromatic dicarboxylic acids (a) are all those dicarboxylic acids of which the carboxyl groups are directly attached to an aromatic ring.

Preferred aromatic dicarboxylic acids (a) correspond to the following formula

in which
A is a divalent aromatic radical containing from 6 to 24 carbon atoms and preferably from 6 to 16 carbon atoms.

Preferred aromatic radicals A are those in which the two bonds to the carboxyl groups extend coaxially in opposite directions, as for example in 1,4-phenylene, 1,4-naphthylene or 4,4'-biphenylene, or in which the bonds extending in opposite directions are displaced parallel to one another, as for example in 1,5-naphthylene, 2,6-naphthylene or 3,5'-biphenylene.

Aromatic radicals A, of which the two bonds to the carboxyl groups do not extend coaxially or with parallel displacement in opposite directions are also suitable providing the two bonds include an angle of 45° to less than 180° and are not situated at immediately adjacent carbon atoms, as for example in 1,3-phenylene, 1,3-, 1,6-, 1,7- or 2,7-naphthylene or 3,4'-biphenylene.

Preferred aromatic dicarboxylic acids (a) are, for example, 1,4-naphthalene dicarboxylic acid, 1,5-naphthalene dicarboxylic acid, 2,6-naphthalene dicarboxylic acid, 4,4'-biphenyl dicarboxylic acid, 3,3'-biphenyl dicarboxylic acid, 4,4'-diphenoxyethane dicarboxylic acid, 4,4'-diphenyl ether dicarboxylic acid, methyl terephthalic acid, methoxy terephthalic acid, chloroterephthalic acid, 4-chloronaphthalene-2,7-dicarboxylic acid, 1.3-naphthalene dicarboxylic acid, 1,6-naphthalene dicarboxylic acid, 1,7-naphthalene dicarboxylic acid, 2,7-naphthalene dicarboxylic acid, 3,4'-biphenyl dicarboxylic acid, 3,4'-diphenyl ether dicarboxylic acid, 4-methylisophthalic acid, 5-methylisophthalic acid, 4,4'-dichlorodiphenyl ether-3,3'-dicarboxylic acid, 4,4'-benzophenone dicarboxylic acid and 3,4'-benzophenone dicarboxylic acid.

Particularly preferred aromatic dicarboxylic acids (a) are isophthalic and terephthalic acid.

Preferred diphenols (b) correspond to the following formula

HO—D—OH                                 (VI)

in which
D is a difunctional, mononuclear or polynuclear aromatic radical containing 6 to 30 carbon atoms, the structure of D being such that the two OH groups are each directly attached to a carbon atom of an aromatic system and the two bonds form an angle of 45° to 180° to the phenolic hydroxyl groups. The constitution of the radical D is governed by the same conditions as described above for the aromatic radical A.

Particularly preferred diphenols (b) are, for example, hydroquinone, 4,4'-dihydroxydiphenyl, 4,4'-dihydroxydiphenyl ether, 4,4'-dihydroxydiphenyl ethane, 4,4'-dihydroxydiphenoxyethane, 3,5'-dihydroxydiphenyl, 3,5'-dihydroxydiphenyl ether, 1,5-dihydroxynaphthalene, 2,6-dihydroxynaphthalene, 1,4-dihydroxynaphthalene, chlorohydroquinone, bromohydroquinone, methyl hydroquinone, phenyl hydroquinone, ethyl hydroquinone, 2,2'-dimethyl-4,4'-dihydroxydiphenyl, 3,3',5-5'-tetramethyl-4,4'-dihydroxydiphenyl, 3,5'-dimethoxy-4,4'-dihydroxydiphenyl ether, 1,2-(2-chloro-4-hydroxyphenoxy)ethane, 4-methoxy-2,6-dihydroxynaphthalene, resorcinol, 3,4'-dihydroxydiphenyl, 3,4'-dihydroxydiphenyl ether, 3,4'-dihydroxydiphenoxyethane, 1,3-dihydroxynaphthalene, 1,6-di-hydroxynaphthalene, 1,7-dihydroxynaphthalene, 2,7-dihydroxynaphthalene, 4-chlororesorcinol, 4-bromoresorcinol, 4-methyl resorcinol, 4-phenylresorcinol, 4-ethoxyresorcinol, 2,5-dichloro-1,6-dihydroxynaphthalene and 4-methoxy-2,7-dihydroxynaphthalene.

Especially preferred diphenols (b) are hydroquinone, resorcinol and 4,4'-dihydroxydiphenyl.

Preferred aromatic hydroxycarboxylic acids (c) are, for example, compounds corresponding to the following formulae

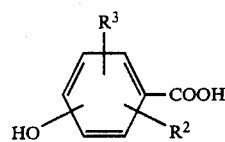                    (VII)

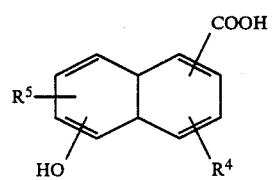                    (VIII)

in which
$R^2$ to $R^5$ represent $C_1$-$C_4$ alkyl, $C_1$-$C_4$ alkoxy, $C_6$-$C_{10}$ aryl or aryloxy, $C_7$-$C_{12}$ aralkyl (preferably benzyl), halogen (preferably chlorine and bromine) or hydrogen and the bonds between the nucleus and the hydroxyl group or carboxyl group form an angle of 45° to 180°.

Particularly preferred aromatic hydroxycarboxylic acids (c) are, for example, 4-hydroxy-3-methylbenzoic acid, 4-hydroxy-3-phenylbenzoic acid, 4-hydroxy-2-ethylbenzoic acid, 3-chloro-4-hydroxybenzoic acid, 3-bromo-4-hydroxybenzoic acid, 4-hydroxy-3-methoxybenzoic acid, 4-methyl-3-hydroxybenzoic acid, 4-hydroxy-3-phenoxybenzoic acid, 6-hydroxy-5-chloro-2-naphthoic acid, 6-hydroxy-5-methyl-2-naphthoic acid, 6-hydroxy-5-methoxy-2-naphthoic acid, 6-hydroxy-4,7-dichloro-2-naphthoic acid.

Especially preferred aromatic hydroxycarboxylic acids (c) are unsubstituted hydroxycarboxylic acids, such as p-hydroxybenzoic acid and 6-hydroxy-2-naphthoic acid.

Not all combinations of the starting materials listed above give thermotropic polyesters. The expert will make his choice on the basis of the literature cited above or will choose suitable combinations on the strength of his experience.

The thermotropic polyesters may contain —COOH, —H, —OH, —$OC_6H_5$, acyloxy or residues of chain terminators as terminal groups. Preferred chain terminators are monofunctional aromatic hydroxyl compounds, such as 4-hydroxydiphenyl, p-nonylphenol, 4-(1,1,3,3-tetramethylbutyl)-phenol, $\beta$-naphthol, and aromatic monocarboxylic acids, such as diphenyl carboxylic acids and naphthalene carboxylic acids. Terminal groups may be present in quantities of 0.5 to 5 mole-%, based on the sum of aromatic dicarboxylic acid residues (a) and diphenol residues (b).

The thermotropic polyesters B may also be branched by trifunctional or higher, preferably aromatic, monomers. The branching compounds are generally used in quantities of 0.1 to 1 mole-%, based on the sum of aromatic dicarboxylic acid residues (a) and diphenol residues (b). Examples of preferred branching agents are phloroglucinol, 1,3,5-benzenetricarboxlic acid and 3,5-dihydroxybenzoic acid.

Other preferred thermotropic polymers B are fully aromatic polyester carbonates, i.e. fully aromatic polyesters, for example of the type described above, some of whose dicarboxylic acid residues, preferably 60 to 90 mole-%, are replaced by carbonyl groups.

Preferred thermotropic fully aromatic polyester carbonates B are polycondensates based on
(a) (optionally substituted) p-hydroxybenzoic acid,
(b) diphenol,
(c) carbonic acid, optionally
(d) aromatic dicarboxylic acid and, optionally,
(e) chain terminator, the diphenol residues (b) partially being present as 4,4'-dihydroxybiphenyl residues (f) and—apart from the terminal groups—the following applying to the molar ratios of the residues:

a + b = 1,
b = c + d,
f = 0.1 to 0.9, preferably 0.11 to 0.7 and more preferably 0.125 to 0.4 and $\dfrac{c}{c + d}$ = 0.6 to 1, preferably 0.6 to 0.9;

a = 0.4 to 0.8, preferably 0.6 to 0.75,
b-f = 0.02 to 0.53, preferably 0.06 to 0.36, more preferably 0.1 to 0.35,
c = 0.12 to 0.6, preferably 0.175 to 0.4,
d = 0 to 0.24, preferably 0 to 0.12 and -continued f = 0.02 to 0.53, preferably 0.0275 to 0.28 and more preferably 0.3 to 0.16.

The thermotropic polyesters and polyester carbonates B generally have an inherent viscosity of at least 0.5, preferably of at least 1.0 dl/g (as measured on a solution of 5 mg polycondensate/ml p-chlorophenol at 45° C.). Should polycondensates be insoluble in p-chlorophenol, it is assumed that they have the minimum viscosity shown.

To improve their properties, the thermotropic polymers B may be subjected to solid-phase post-condensation which is normally carried out for 1 to 25 hours at 200° to 300° C. and under reduced pressure.

Fluorinated polyolefins C

The fluorinated polyolefins C are of high molecular weight and have glass transition temperatures above −30° C. and generally above 100° C., fluorine contents of 59 to 76, preferably 65 to 76 and more preferably 70 to 76% by weight and average particle diameters $d_{50}$ of 0.05 to 20 and preferably 0.08 to 10 pm. Preferred fluorinated polyolefins C are polytetrafluoroethylene, polyvinylidene fluoride, tetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, pages 484–494,"Fluorpolymers" by Wall, Wiley-Interscience, John Wiley & Sons, Inc., New York, Vol. 13, 1970, pages 623–654; "Modern Plastics Encyclopedia", 1970–1971, Vol. 47, No. 10 A, October 1970, McGraw Hill, Inc., New York, pages 134 and 774; "Modern Plastics Encyclopedia", 1975–1976, October 1975, Vol. 52, no. 10 A, McGraw Hill, Inc., New York, pages 27, 28 and 472, and U.S. Pat. Nos. 3,671,487, 3,723,373 and 3,838,092).

The fluorinated polyolefins C are preferably used in non-sintered form.

Elastomeric graft polymers D

Elastomeric graft polymers D in the context of the invention are graft polymers which have a glass transition temperature (as measured by differential thermal analysis); of at least below 10° C., preferably below 0° C. and more preferably below −20° C. They comprise graft polymers essentially obtainable from at least two of the following monomers: chloroprene, 1,3-butadiene, isoprene, styrene, acrylonitrile, ethylene, propylene, vinyl acetate and (meth)acrylates containing 1 to 18 carbon atoms in the alcohol component; i.e. graft polymers of the type described, for example, in "Methoden der Organischen Chemie" (Houben-Weyl), Vol. 14/1, Georg Thieme Verlag, Stuttgart 1961, pages 393 to 406, and in C. B. Bucknall, "Toughened Plastics", Appl. Science Publishers, London 1977. Preferred graft polymers D are at least partly crosslinked and have gel contents of over 20% by weight, preferably over 40% by weight and more preferably over 60% by weight.

The gel content of the crosslinked diene rubbers is determined in toluene at 25° C. while the gel content of the crosslinked acrylate rubbers is determined in dimethylformamide at 25° C. (M. Hoffmann, H. Krbmer, R. Kuhn, Polymeranalytik I and II, Georg Thieme Verlag, Stuttgart 1977).

Preferred graft polymers D are, for example, polybutadienes, butadiene/styrene copolymers and acrylate rubbers grafted with styrene and/or acrylonitrile and-/or alkyl (meth)acrylates, i.e. copolymers of the type described in DE-OS No. 16 94 173 (=U.S. Pat. No. 3,564,077); polybutadienes, butadiene/styrene or butadiene/acrylonitrile copolymers, polyisobutenes or polyisoprenes grafted with alkyl acrylates or methacrylates, vinyl acetate, acrylonitrile, styrene and/or alkyl styrenes, of the type described for example in DE-OS No. 23 48 377 (=U.S. Pat. No. 3,919,353).

Graft bases suitable for the preparation of the graft polymers D are, in particular, polybutadiene, butadiene/styrene copolymers containing up to 30% by weight, based on the graft base, of a lower alkyl ester of acrylic or methacrylic acid (for example methyl methacrylate, ethyl acrylate, methyl acrylate or ethyl methacrylate).

Particularly preferred graft polymers D are, for example, ABS polymers as described, for example, in DE-OS No. 20 35 390 (=U.S. Pat. No. 3,644,574) or in DE-OS No. 22 48 242 (=GB-P No. 1,409,275).

Particularly preferred graft polymers D are those obtainable by graft reaction of I. 10 to 70, preferably 15 to 50 and more preferably 20 to 40% by weight, based on graft product, of at least 1 (meth) acrylate or 10-to 70, preferably 15 to 50 and more preferably 20 to 40% by weight of a mixture of 10 to 50 and preferably 20 to 35% by weight, based on the mixture, of acrylonitrile or (meth)acrylates and 50 to 90 and preferably 65 to 80% by weight, based on the mixture, of styrene on II. 30 to 90, preferably 50 to 85 and more preferably 60 to 80% by weight, based on graft product, of a butadiene polymer containing at least 50% by weight, based on II, of butadiene residues as the graft base.

(Meth)acrylates I are esters of acrylic or methacrylic acid and monohydric $C_1$–$C_8$ alcohols. Methyl, ethyl and propyl methacrylate are particularly preferred.

In addition to butadiene residues, the graft base II may contain up to 50% by weight, based on II, of residues of other ethylenically unsaturated monomers, such as for example styrene, acrylonitrile, acrylates or methacrylates containing 1 to 4 carbon atoms in the alcohol component (such as methyl acrylate, ethyl acrylate, methyl methacrylate, ethyl methacrylate), vinyl esters and vinyl ethers. The preferred graft base II consists of pure polybutadiene.

Since it is known that the graft monomers I are not always completely grafted onto the graft base II in the grafting reaction, graft polymers D in the context of the invention are also understood to include products obtained by polymerization of the monomers I in the presence of the bases II.

The molding compositions according to the invention show optimal properties when the quantity of free (co)polymer does not exceed 15% by weight, preferably 10% by weight and more preferably 7% by weight, based on component D. The Staudinger index of these free (co)polymers should be less than 0.6 dl/g and preferably less than 0.4 dl/g, as measured in dimethylformamide at 25° C.

Other suitable graft bases are, for example, polyisoprene or alkyl acrylate rubbers based on $C_1$–$C_8$ alkyl acrylates, particularly ethyl, butyl, ethylhexyl acrylate. These alkyl acrylate rubbers used as the graft base may optionally contain up to 30% by weight, based on the graft base, of copolymerized monomers, such as vinyl acetate, acrylonitrile, styrene, methyl methacrylate and- /or vinyl ethers. These alkyl acrylate rubbers used as the graft base may also contain relatively small quantities, preferably 0.02 to 5% by weight and more preferably 0.05 to 2% by weight, based on the graft base, of crosslinking ethylenically unsaturated monomers. Crosslinkers such as these are, for example, alkylenediol di(meth)acrylates, polyester di(meth)acrylates, divinylbenzenes, trivinylbenzenes, triallyl cyanurate, allyl (meth)acrylate, butadiene or isoprene. Alkyl rubbers as the graft base may also be products which contain a crosslinked diene rubber of one or more conjugated dienes, such as polybutadiene, or a copolymer of a conjugated diene with an ethylenically unsaturated monomer, such as styrene and/or acrylonitrile, as core. Other suitable graft bases are, for example, EPDM rubbers, i.e. rubbers of ethylene, propylene and an unconjugated diene monomer.

Particularly preferred graft bases for the production of the graft polymers D are diene and alkyl acrylate rubbers.

Particularly preferred graft monomer compositions contain
1. 50 to 95% by weight styrene, α-methyl styrene, 2,4-dimethyl styrene, methyl methacrylate or mixtures thereof and
2. 50 to 5% by weight (meth)acrylonitrile, methyl methacrylate, maleic anhydride, N-substituted maleic imide or mixtures thereof,
the percentages being based on the sum of components (1) and (2).

Particularly preferred graft polymers D may be obtained from 5 to 90 and preferably 30 to 80 parts by weight graft monomer and 95 to 10 and preferably 70 to 20 parts by weight graft base.

In general, the graft polymers D are present in the form of at least partially crosslinked particles having an average particle size of 0.1 to 2 μm and preferably 0.2 to 0.6 μm. The graft polymers D may be prepared by radical graft copolymerization of the above-described monomers in the presence of the graft bases to be grafted. Preferred production processes for the graft polymers D are emulsion, solution, mass or suspension polymerization.

Since the graft polymers D to be used in accordance with the invention are preferably used by premixing of dispersions thereof with dispersions of component C, component D is best prepared by emulsion polymerization.

The graft polymers D suitable for use in accordance with the invention are used in the form of aqueous dispersions having particle sizes of 0.1 to 2 μm and preferably from 0.2 to 0.6 μm. Dispersions such as these are known or may be prepared in a known manner from the graft polymers D described above or accumulate in the actual preparation of the graft polymers.

In one preferred embodiment, aqueous dispersions of the fluorinated polyolefin C and the graft polymer D are mixed and the two polymers coagulated together. This is done, for example, by spray drying, freeze drying or coagulation by addition of inorganic or organic salts, acids, bases or organic water-miscible solvents, preferably at temperatures of 20° to 150° C. and more preferably at temperatures of 50° to 100° C. If necessary, drying may be carried out at 50° to 200° C. and preferably at 70° to 150° C.

The ratio by weight of graft polymer D to fluorinated polyolefin C in the dispersion mixture may be 95:5 to 60:40.

Dispersions of fluorinated polyolefin C suitable for this purpose have solids contents of 30 to 70% by weight and preferably from 50 to 60% by weight. The average particle diameters $d_{50}$ in the dispersions are preferably from 0.05 to 0.8 and more preferably from 0.1 to 0.5 μm. The dispersions of the graft polymers D generally have solids contents of from 25 to 60% by weight and preferably from 30 to 45% by weight.

In a variant of the preferred embodiment, in which the graft polymer D and the fluorinated polyolefin C are precipitated together, co-precipitated product may be combined with graft polymer D (which is free from fluorinated polyolefin C). For example, it is possible in accordance with this variant to use
(a) 25 to 75 and preferably 40 to 60 parts by weight graft polymer D and fluorinated polyolefin C, which have been co-precipitated from a mixture of aqueous dispersions of both polymers,
(b) 75 to 25 and preferably 60 to 40 parts by weight graft polymer D (which is free from fluorinated polyolefin C) and, optionally,
(c) an adequate quantity of fluorinated polyolefin C such that, after components a+b+c have been mixed w&th components A+B, the claimed content of fluorinated polyolefin in the molding composition A+B+C+D is obtained.

Conversely, it is of course also possible to use
(a) graft polymer D having a glass transition temperature below −30° C. and fluorinated polyolefin C, which have been co-precipitated from a mixture of aqueous dispersions of both polymers, and
(b) fluorinated polyolefin C together.

In view of the small content of fluorinated polyolefin C in molding compositions according to the invention, the range of possible mixing ratios is correspondingly narrower in this case.

According to the invention, "particle size" always means average particle diameters $d_{50}$ as determined by ultracentrifuge measurements in accordance with W. Scholtan, H. Lange, Kolloid Z. and Z. Polymere 250 (1972), 782–796.

The molding compositions according to the invention may contain standard additives, such as lubricants and mold release agents, nucleating agents, stabilizers, fillers and reinforcing materials, flameproofing agents and also dyes and pigments.

The filled or reinforced molding compositions may contain up to 60% by weight and preferably from 10 to 60% by weight, based on the filled or reinforced molding composition, of fillers and/or reinforcing materials. Preferred reinforcing materials are glass fibers. Preferred fillers, which may also have a reinforcing effect, are glass beads, mica, silicates, quartz, talcum, titanium dioxide, wollastonite.

The flameproofed molding compositions contain flameproofing agents in a concentration of generally 3 to 15% by weight, based on the flameproofed molding compositions.

The mixing of components A to D and, optionally, other auxiliaries or of components A and B with the mixtures of components C and D and, optionally, other auxiliaries may take place in a known manner either successively or in a single step both at around 20° C. (room temperature) and at a higher temperature.

In one preferred embodiment, the molding compositions according to the invention contain effective quantities of stabilizer in order as far as possible to prevent undesirable esterification of components A and B with one another.

The following method is recommended for determining whether a given quantity of stabilizer effectively suppresses the unwanted transesterification. In a kneading machine, components A and B, preferably in granulate form, are mixed with the stabilizer for 15 minutes at 60 r.p.m. and at a temperature of 300° C. That part of the mixture thus obtained which is soluble in $CH_2Cl_2$ at 25° C. is investigated for transesterification by $^1H$-NMR spectroscopy; cf. J. Defaux, P. Godard, J. P. Mercier, J. Polym. Sci., Polym. physics Ed., 20, 1881–1894 (1982). If the degree of transesterification thus determined is below 5 mole-%, based on the sub-stoichiometric component, the quantity of stabilizer tested is classified as "effective" in the context of the invention.

The compounds which can prevent transesterification are known to the expert and comprise, for example, phosphoric acid, phosphorous acid and aliphatic, aromatic or araliphatic esters thereof, for example alkyl esters containing 6 to 18 carbon atoms in the alcohol component, phenyl esters of which the phenyl radicals may optionally be substituted by 1 to 3 $C_6$–$C_{18}$ substituents, such as trinonylphenyl phosphate, dodecylphenyl phosphate and triphenyl phosphate; arsenic compounds, such as arsenic (III) and arsenic (V) oxide; boric acid derivatives; acetoacetic acid esters. A review of stabilizers of the type in question can be found in H. Ludewig, Polyesterfasern, 2nd Edition, Akademie-Verlag, Berlin 1974. Particularly preferred stabilizers according to the invention are, for example,

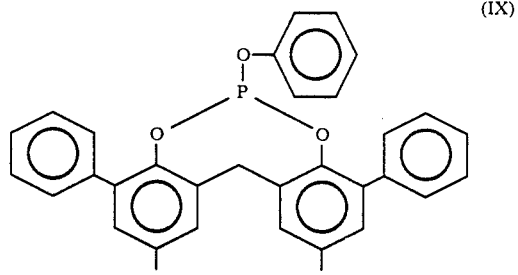

(IX)

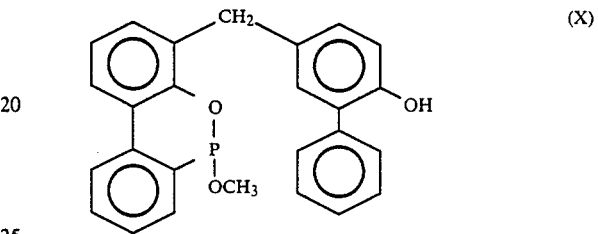

(X)

and formaldehyde condensates thereof containing up to 10 recurring units X

(XI)

(XII)

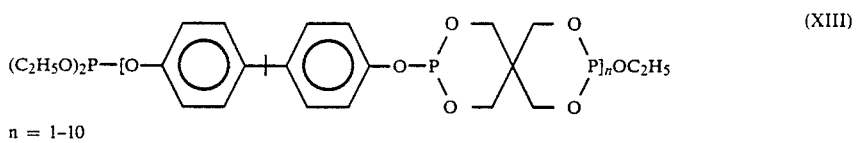

(XIII)

n = 1–10

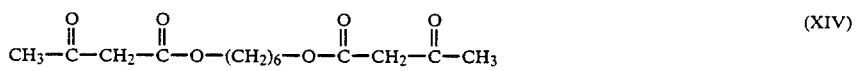

(XIV)

(XV)

(XVI)

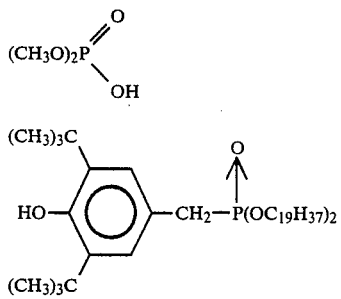

(XVII)

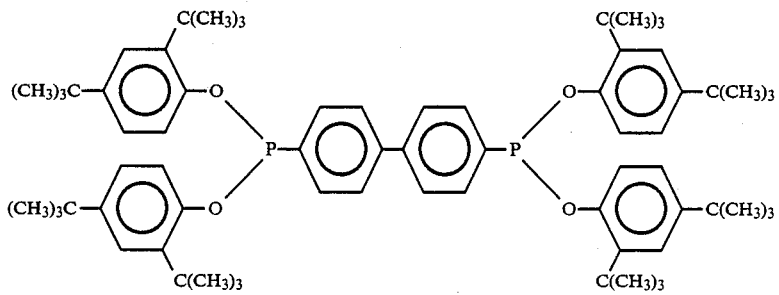

(XVIII)

(XIX)

The molding compositions according to the invention are preferably produced from the various components in extruders, although kneaders, mixing rolls or stirred vessels are also suitable. Accordingly, the present invention also relates to a process for the production of the molding compositions according to the invention in the melt, preferably at temperatures of 280° to 320° C.

The molding compounds according to the invention may be processed from the melt to form injection molded articles, filaments, fibers, ribbons, and films, the shear forces generated producing a molecular orientation in the liquid crystal phase which is influenced to a high degree by the intensity of the shear forces. Accordingly, they show pronounced structural viscosity which decreases considerably with increasing shear forces. Suitable processing techniques are injection molding, extrusion, compression molding and melt spinning.

Molded articles produced from the molding compositions according to the invention are used in particular for the production of
- electrotechnical articles such as, for example, insulators, printed circuits, plugs, fittings,
- parts for furnishing the interior of aircraft,
- parts of medical-technical equipment, including for example components of air conditioning installations, valve components.

However, the molding compositions according to the invention may also be used as a coating material (in powder form or dispersion).

Accordingly, the present invention relates to the use of the new molding compositions for the production of molded articles, filaments, fibers and films.

EXAMPLES

Components used:
(A) Homopolycarbonate based on bisphenol A having a relative solution viscosity of 1.32, as measured on a 0.5% by weight solution in $CH_2Cl_2$ at 25° C., and prepared using phenol as chain terminator.
(B) Fully aromatic polyester based on 0.65 mole p-hydroxybenzoic acid, 0.3 mole hydroquinone, 0.3 mole isophthalic acid, 0,05 mole terephthalic acid and 0,05 mole 4,4'-dihydroxydiphenyl.
(C) Tetrafluoroethylene polymer in powder form having a particle size of 500 to 650 $\mu$m and a density of 2.18 to 2.20 g/cm$^3$ (Hostaflon TF 2026 ®, a product of Hoechst).
(D) Graft polymer of 50% by weight of a mixture of styrene and acrylonitrile (ratio by weight 72:28) on 50% by weight polybutadiene having an average particle size ($d_{50}$) of 0.3 to 0.4 $\mu$m and obtained by emulsion polymerization.
(C/D) Coagulated mixture of a dispersion of the graft polymer D and a dispersion of the tetrafluoroethylene polymer C in water; content of tetrafluoroethylene polymer in the mixture: 10% by weight, based on the mixture of PTFE and graft polymer. The tetrafluoroethylene polymer dispersion has a solids content of 60% by weight and a particle size of 0.05 to 0.5 $\mu$m. The graft polymer dispersion has a solids content of 34% by weight and a latex particle size of 0.3 to 0.4 $\mu$m.

Preparation of C/D

The dispersion of the tetrafluoroethylene polymer (C) is mixed with the dispersion of the graft polymer (D) and stabilized with 1.8% by weight, based on solids, of phenolic antioxidants. At 85° to 95° C., the mixture is coagulated with an aqueous solution of $MgSO_4$ (Epsom salt) and acetic acid at pH 4 to 5, filtered and washed until substantially free from electrolyte, subsequently freed from most of the water by centrifugation and then dried at 100° C. to form a powder. This powder may then be compounded with the other components in the units described above.

To produce the molding compositions, the components were first dried in vacuo for 16 hours at 90° C. The granulates of the components were mixed together and then fused and thoroughly mixed in a twin-screw extruder, being discharged in the form of a strand. The strand was cooled and chopped into granulate. The granulate of the mixture was redried immediately before further processing. Number 3 test bars were made by injection molding under a pressure of 60 bar at a melt temperature of 330° C. (±3° C.) and at a mold temperature of 90° C.

The typical result from the evaluation of an unmodified polycarbonate/LC polyester mixture is shown for comparison.

The tendency of the test specimens to delaminate was first visually assessed using unstressed test specimens, The test specimens were then divided by means of a punch and the delamination emanating from the cut surface evaluated. The delamination tendency was evaluated on the basis of the following scale:

5: spontaneous delamination of unstressed test specimen;
4: no delamination of unstressed test specimen, but spontaneous delamination emanating from the cut surface;
3: no spontaneous delamination, but test specimen can be split with minimal effort from the cut surface;.
2: no spontaneous delamination; test specimen can only be split with force from the cut surface;
1: homogeneous; test specimen does not split, even under considerable force.

The results are shown in the following Table:

|  | Comp. A (% by weight) | Comp. B (% by weight) | Comp. C/D (% by weight) | Stabilizer Type | Stabilizer (% by weight) | Degree of delamination |
|---|---|---|---|---|---|---|
| Comparison Example |  |  |  |  |  |  |
| 1 | 89.9 | 10.0 | — | XII | 0.1 | 4 |
| Example |  |  |  |  |  |  |
| 2 | 89.8 | 10.0 | 0.1 | XII | 0.1 | 2 |
| 3 | 89.4 | 10.0 | 0.5 | XVI | 0.1 | 2 |
| 4 | 88.9 | 10.0 | 1.0 | XVI | 0.1 | 1 |
| 5 | 86.9 | 10.0 | 3.0 | XII | 0.1 | 2 |

We claim:
1. Thermoplastic molding compositions of

A. 1 to 98.87% by weight of an aromatic polycarbonate,
B. 1 to 86% by weight of a thermotropic polymer,
C. 0.05 to 5% by weight of a fluorinated polyolefin and
D. 0.08 to 8% by weight of an elastomeric graft polymer, the percentages being based in each case on the sum of components A to D.

2. Molding compositions as claimed in claim 1 of
 50 to 94.4% by weight component A,
 5 to 44.4% by weight component B,
 0.1 to 1% by weight component C and
 0.5 to 5% by weight component D.

3. Molding compositions as claimed in claim 1 containing 80 to 94.4% by weight component A and 5 to 19.4% by weight component B.

4. Molding compositions as claimed in claim 1 obtainable by using a product C+D which has been obtained by mixing aqueous dispersions of components C+D by co-precipitation of these components.

5. A process for the production of the molding compositions claimed in claim 1 by mixing of the components in the melt.

6. Articles of manufacture comprising molded articles, filaments, fibers, and films which comprise the molding composition according to claim 1.

* * * * *